United States Patent [19]

Rubinchik

[11] Patent Number: 5,773,907
[45] Date of Patent: Jun. 30, 1998

[54] BRUSH HOLDER ASSEMBLIES HAVING NOVEL BRUSH HOLDERS

[75] Inventor: Ilya Rubinchik, London, Canada

[73] Assignee: Siemens Canada Ltd., Mississagua, Canada

[21] Appl. No.: 495,135

[22] Filed: Jun. 28, 1995

Related U.S. Application Data

[63] Continuation-in-part of Ser. No. 234,737, Apr. 28, 1994.

[51] Int. Cl.[6] .................................................. H02U 13/00
[52] U.S. Cl. .......................... 310/248; 310/242; 310/248
[58] Field of Search .................................. 310/239, 242, 310/248, 249

[56] References Cited

U.S. PATENT DOCUMENTS

| | | | |
|---|---|---|---|
| 1,954,910 | 1/1934 | Allen | 171/324 |
| 3,510,709 | 5/1970 | Walker | 310/239 |
| 3,654,504 | 4/1972 | Susdorf et al. | 310/239 |
| 3,656,018 | 4/1972 | Maher | 310/242 |
| 3,716,735 | 2/1973 | Dippold | 310/240 |
| 4,056,749 | 11/1977 | Carlson, Jr. et al. | 310/239 |
| 4,114,061 | 9/1978 | Hayes | 310/241 |
| 4,115,061 | 9/1978 | Grünewälder | 8/137 |
| 4,136,295 | 1/1979 | Sweet | 310/239 |
| 4,163,167 | 7/1979 | Zelt et al. | 310/242 |
| 4,174,142 | 11/1979 | Pesce et al. | 339/5 R |
| 4,329,605 | 5/1982 | Angi et al. | 310/68 R |
| 4,340,832 | 7/1982 | Cheetham et al. | 310/239 |
| 4,354,128 | 10/1982 | Chew et al. | 310/242 |
| 4,366,404 | 12/1982 | Ziegler | 310/239 |
| 4,404,488 | 9/1983 | Herr | 310/239 |
| 4,409,508 | 10/1983 | Ooki et al. | 310/239 |
| 4,498,230 | 2/1985 | Harris et al. | 310/242 |
| 4,559,465 | 12/1985 | Gagneux | 310/242 |
| 4,593,220 | 6/1986 | Cousins et al. | 310/239 |
| 4,593,221 | 6/1986 | Harris et al. | 310/242 |
| 4,607,184 | 8/1986 | Takahashi et al. | 310/247 |
| 4,782,261 | 11/1988 | Crevling, Jr. et al. | 310/242 |
| 4,845,396 | 7/1989 | Huber | 310/239 |
| 4,851,730 | 7/1989 | Fushiya et al. | 310/249 |
| 4,866,322 | 9/1989 | Baumeister et al. | 310/239 |
| 4,868,665 | 9/1989 | Bulick | 310/239 |
| 4,994,701 | 2/1991 | Bulick | 310/239 |
| 5,053,665 | 10/1991 | Yamaguchi et al. | 310/239 |
| 5,159,222 | 10/1992 | Southall | 310/239 |
| 5,162,688 | 11/1992 | Bouton | 310/239 |
| 5,196,750 | 3/1993 | Strobl | 310/239 |
| 5,434,463 | 7/1995 | Horski | 310/248 |

FOREIGN PATENT DOCUMENTS

| | | |
|---|---|---|
| 0 258 132 | 3/1988 | European Pat. Off. . |
| 0 343 126 | 11/1989 | European Pat. Off. . |
| 0 397 973 | 11/1990 | European Pat. Off. . |
| 0 615 316 A2 | 9/1994 | European Pat. Off. . |
| 52-47253 | 11/1978 | Japan . |
| 53-132705 | 11/1978 | Japan . |
| WO 94/29935 | 12/1994 | WIPO . |

OTHER PUBLICATIONS

Seven–page European Search Report No. PCT/CA96/00438, mailed on Nov. 10, 1996.
Seven–page European Search Report No. PCT/CA95/00241 mailed on Apr. 08, 1995.

*Primary Examiner*—Steven L. Stephan
*Assistant Examiner*—Michael J. Wallace, Jr.
*Attorney, Agent, or Firm*—Siemens Corp.

[57] ABSTRACT

A brush holder embodies certain generic features that render it suitable for use in numerous brush card assemblies. The brush holder has sidewalls that provide guidance of an associated brush, and integral locators for locating an associated spring strip for urging the brush toward a commutator. A brush holder may be formed singly, or multiple brush holders may be integrally formed and joined by an integral bus bar.

55 Claims, 6 Drawing Sheets

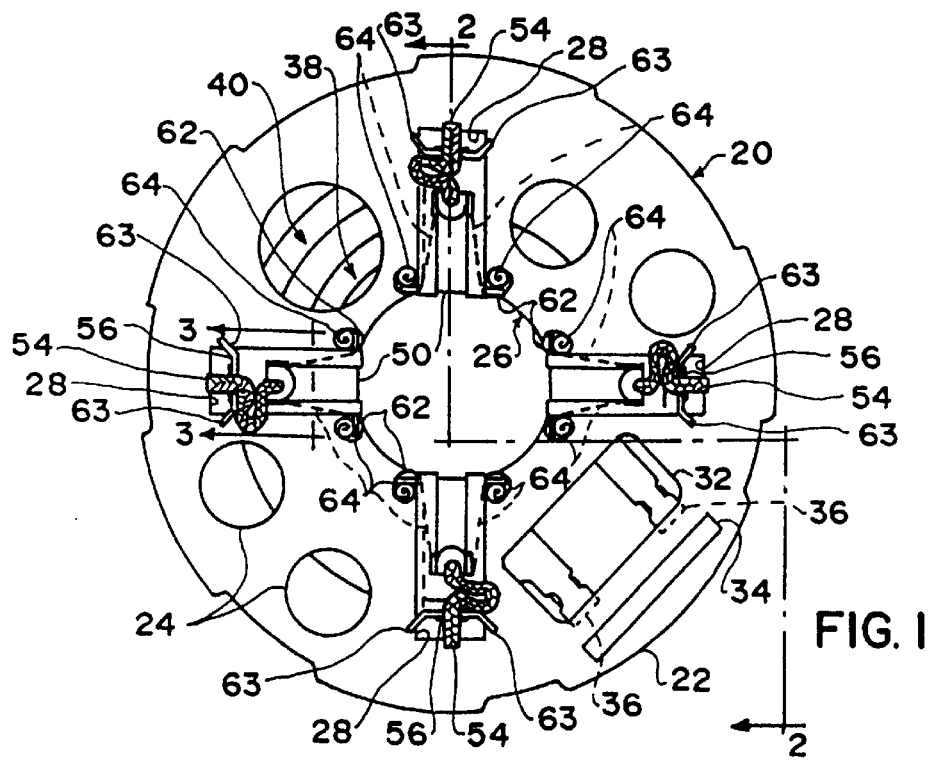
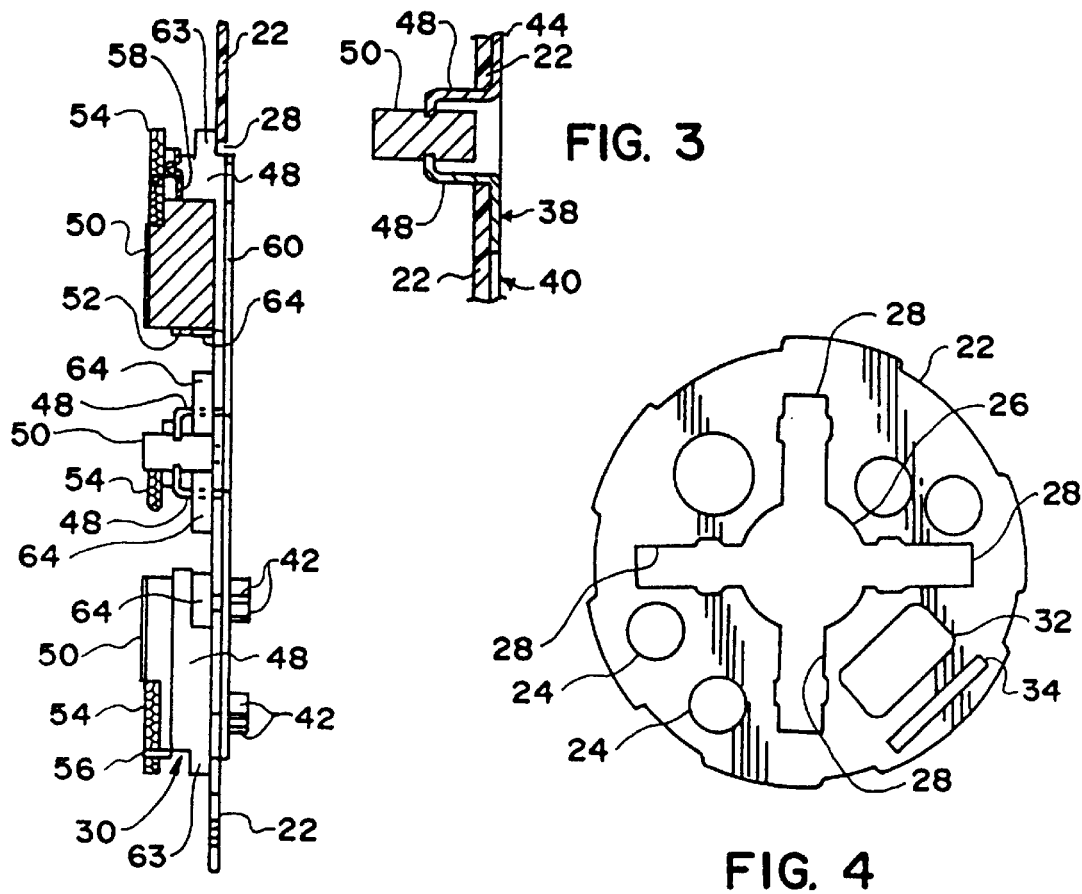
FIG. 1
FIG. 3
FIG. 2
FIG. 4

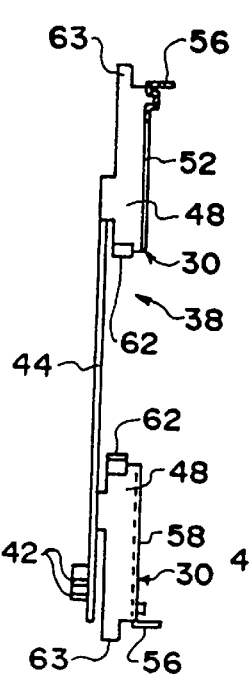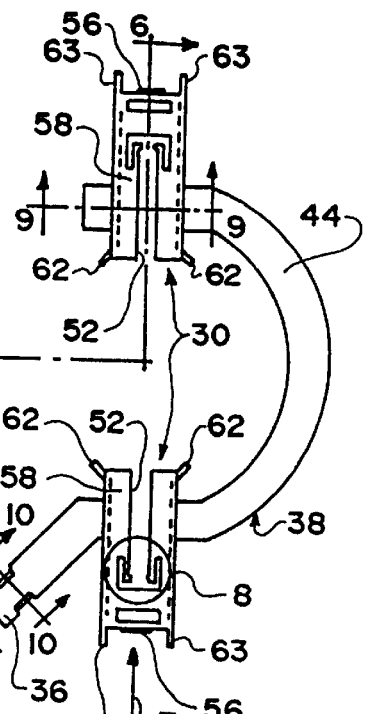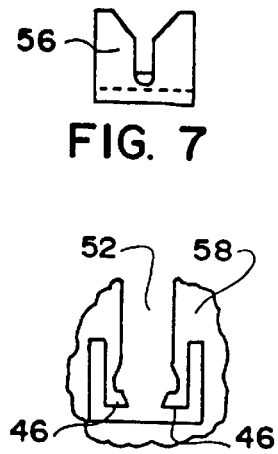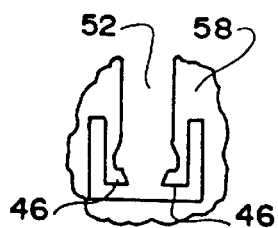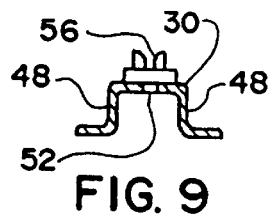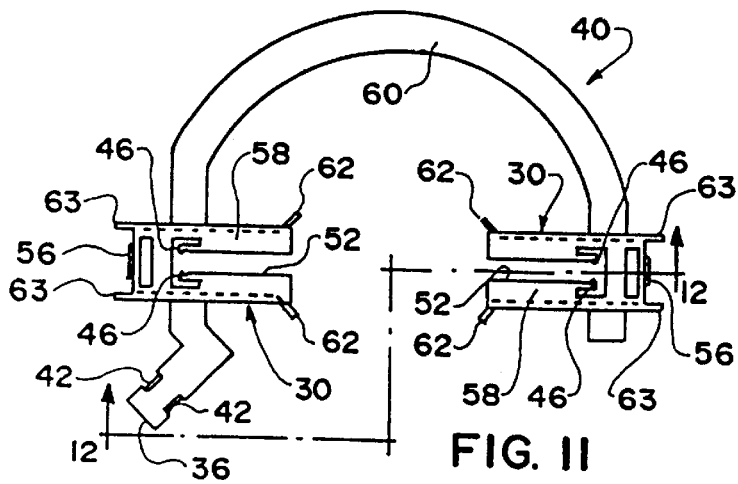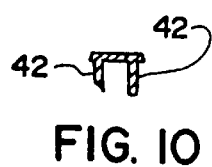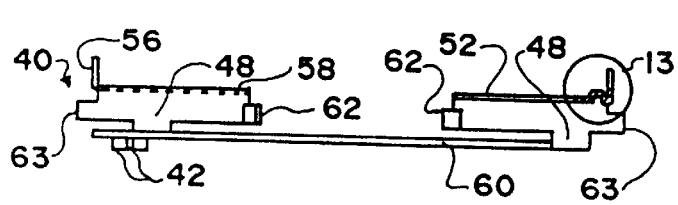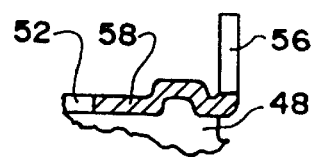

BRUSH HOLDER ASSEMBLIES HAVING NOVEL BRUSH HOLDERS

REFERENCE TO A RELATED APPLICATION

This application is a continuation-in-part of pending application Ser. No. 08/234,737, filed 28 Apr., 1994.

FIELD OF THE INVENTION

This invention in general relates to rotating electrical machines, such as direct current motors for example, and more particularly to brush holders and brush holder, or brush card, assemblies for such machines.

BACKGROUND AND SUMMARY OF THE INVENTION

U.S. Pat. No. 4,559,465 (Gagneux), issued Dec. 17, 1985, describes a brush holder assembly having a simple flat card comprising slots for guiding the brushes and openings for receiving coils of the brush springs. The springs have elongated tails that extend from the coils to engage radially outer ends of the associated brushes for biasing them radially inwardly into electrical contact with a commutator. When the brushes are in retracted condition, the ends of the elongated tails engage the sides of the brushes, holding the brushes retracted.

U.S. Pat. No. 4,354,128 (Chew et al), issued Oct. 12, 1982, also describes a brush holder assembly in which a flat brush card comprises slots for guiding the brushes.

U.S. Pat. No. 4,782,261 (Crevling, Jr. et al), issued Nov. 1, 1988, describes a brush tube that guides the respective brush and includes an integral wiring tab at the side of the tube.

U.S. Pat. No. 4,994,701 (Bulick), issued Feb. 19, 1991, describes a multiple piece brush holder assembly having a constant force spring strip for biasing the respective brush toward a commutator. The spring strip comprises coiled end segments that are disposed around respective posts and an uncoiled segment extending from one coiled end segment along a respective side of the brush, thence laterally across the end of the brush, and thence along the opposite side of the brush to the other coiled end segment.

U.S. Pat. No. 4,366,404 (Ziegler), issued Dec. 28, 1982, and U.S. Pat. No. 4,409,508 (Ooki et al), issued Oct. 11, 1983, disclose other forms of spring strips having coiled and uncoiled portions for urging the associated brush toward the commutator.

The present invention relates to further improvements in the art of brush holder assemblies and brush holders for rotating electrical machines. One important aspect of the invention relates to a novel one-piece brush holder that is generic to multiple brush holder assemblies. With respect to usage in DC electric motors of the type commonly used in automotive vehicles, such as for power window lifts, cooling modules, etc., the inventive generic brush holder can be used a variety of applications including two or more pole applications, and single-and multiple-speed motor applications.

One preferred embodiment of the inventive generic brush holder comprises a conductive metal part, brass for example, that is adapted for mounting on a non-conductive brush card and that: 1) has sidewalls for guiding the radial positioning of an associated brush relative to a commutator; 2) has integral locating means for locating an associated elongate spring strip that is partially uncoiled to urge the associated brush toward the commutator and that comprises a coiled segment that is located by the integral locating means, an uncoiled segment extending radially outwardly along a respective side of the brush from the coiled segment, thence extending laterally across a surface of the brush, and thence extending radially inwardly along the opposite side of the brush to an opposite lengthwise end segment of the spring strip that is also located by the integral locating means, and may also be a coiled segment which, like the other coiled segment, coils and uncoils in accordance with the positioning of the brush relative to the brush holder to exert a generally constant spring force on the brush; and 3) at least one integral wiring tab providing for attachment of an electrical wire from a respective terminal of an electrical connector of the rotating electric machine to establish electrical continuity from the wire to the brush.

Although the inventive brush holder embodies certain generic aspects, specific embodiments relate to specific applications, and therefore this disclosure presents a number of these specific embodiments, which represent further aspects of the invention. one principal advantage of the present invention is to minimize the number of parts forming a brush holder assembly and thereby reduce the cost of manufacture.

It is an additional advantage of the invention to reduce the number of operations in the manufacture of a brush holder assembly.

It is still another advantage to provide a more compact brush holder, thus leaving more space on the brush card for connection features or attachments as required.

It is yet another advantage to provide efficient cooling for the brushes.

Certain portions of the inventive brush holder may be constructed in any of certain alternate configurations, thus providing a large number of possible combinations, and hence a large number of specific embodiments.

One such portion that may have alternate configurations is the sides of the brush holder. By providing a brush holder with sides of sufficient height relative to a face of a brush card, the entire brush may be spaced from that face; alternatively, the sides of the brush holder may be made shorter in height, and the brush card provided with an aperture that affords clearance to that portion of the brush that protrudes through the aperture.

Another portion that may have alternate configurations is the locating means for locating the associated spring strip. One configuration comprises utilizing as the locating means, one or more staking tabs that are used to stake the brush holder to the brush card; another configuration comprises providing the locating means as a radially inwardly facing notch in an upstanding tab, or flange, at, or adjacent, the inner end of a sidewall.

While certain brush card assemblies may comprise two or more individual brush holders, other brush card assemblies may comprise plural brush holders that are joined together by an integrally formed bus bar. Moreover, a single brush card may comprise multiple brush holders, certain selected ones of which are joined together by their own integral bus bar while other selected ones are joined together by their own integral bus bar. Such other constructions may be considered to constitute a "building block" concept.

Certain embodiments comprise more than just a single brush card assembly. In one embodiment, two brush card assemblies are placed back-to-back with an insulator disposed between them. These can also be considered to represent "building block" concepts.

Other embodiments are like those described above that comprise an integral bus bar joining plural brush holders, except that the integral bus bar is replaced by an insulated electric wire whose ends are stripped of insulation, and the brush holders comprise integral wiring tabs that are crimped onto the electrical conductor wire that is exposed at the stripped ends. These brush holders may also have retaining tabs for retaining insulated portions of the wires, as will be described in greater detail later on.

The foregoing features and advantages will become more apparent in the ensuing detailed description of various embodiments that are the subject of the accompanying drawings. The drawings and description disclose a presently preferred embodiment in accordance with the best mode contemplated at this time for carrying out the inventive principles.

BRIEF DESCRIPTION OF THE DRAWINGS

FIG. 1 is a plan view of one face of one embodiment of a four-pole, single-speed brush holder assembly;

FIG. 2 is an enlarged view, partly in section, as taken along line 2—2 in FIG. 1;

FIG. 3 is an enlarged fragmentary section view as taken along line 3—3 in FIG. 1;

FIG. 4 is an ensmalled plan view of one face of the brush card of the brush holder assembly of FIG. 1;

FIG. 5 is a plan view of the inner bus bar member of the brush holder assembly of FIG. 1 prior to association with the brush card;

FIG. 6 is a view, partly in section, as taken along line 6—6 in FIG. 5;

FIG. 7 is an enlarged end view taken in the direction of arrow 7 in FIG. 5;

FIG. 8 is an enlarged view in circle 8 in FIG. 5;

FIG. 9 is a section view as taken along line 9—9 in FIG. 5;

FIG. 10 is a fragmentary section view as taken along line 10—10 in FIG. 5;

FIG. 11 is a plan view of the outer bus bar member of the brush holder assembly of FIG. 1 prior to association with the brush card;

FIG. 12 is a view, partly in section, as taken along line 12—12 in FIG. 11;

FIG. 13 is an enlarged view in circle 13 in FIG. 12;

DESCRIPTION OF THE PREFERRED EMBODIMENT

Figure 14:
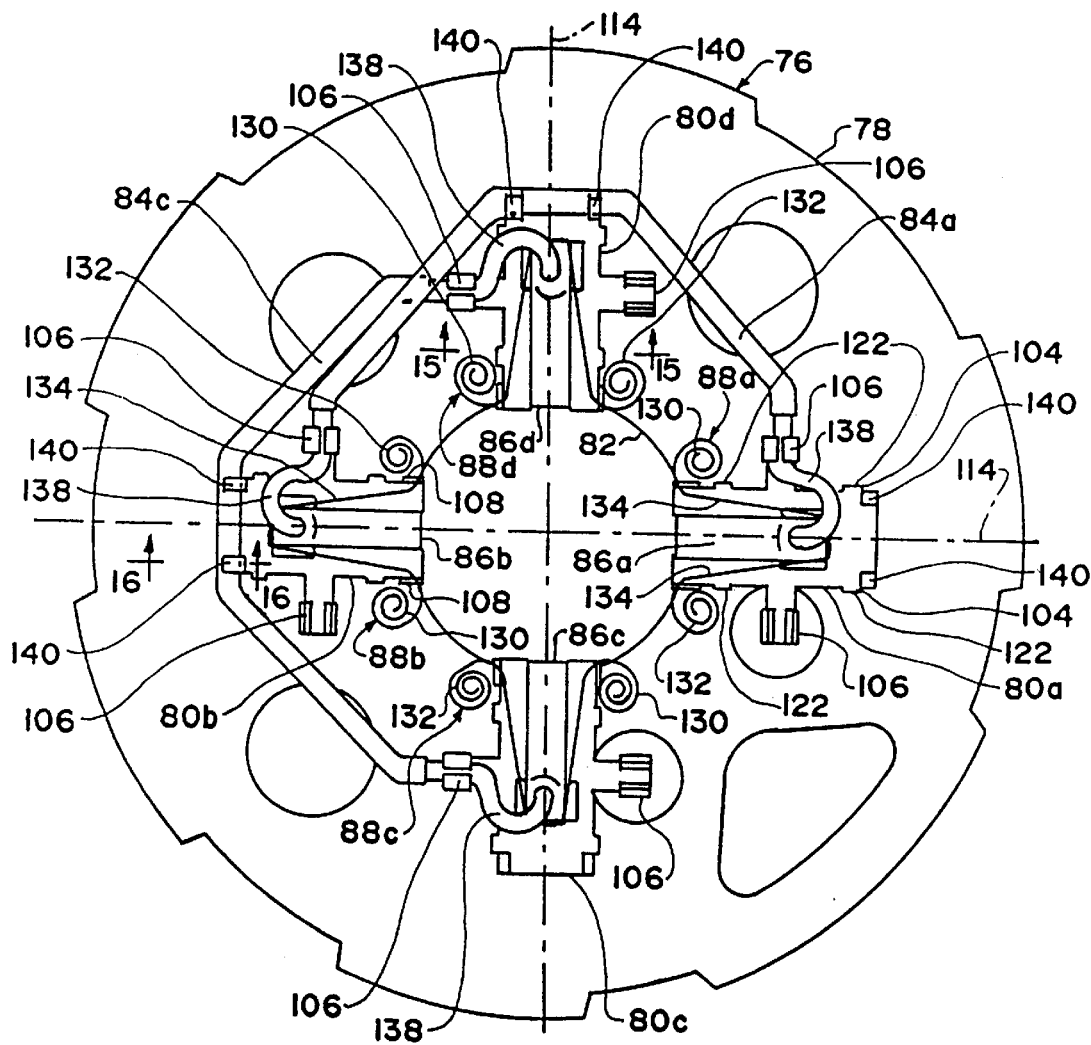
FIG. 14 is a plan view of one face of another embodiment of brush holder assembly.

FIG. 1 shows a brush holder assembly 20 having a brush card 22 (illustrated by itself in FIG. 4) fabricated from a non-electrically conductive material. Brush card 22 has a plurality of apertures, such as apertures 24. A larger central aperture 26 having four elongated slots 28 equally spaced around its periphery provides for the mounting of brush holders 30. In addition there are a pair of apertures 32, 34 to provide for mounting of an electrical connector plug (not shown) and its electrical connection to wiring tabs 36 that are formed at an end of an inner bus bar member 38 and at an end of an outer bus bar member 40 which are respectively illustrated in FIGS. 5 and 11. FIG. 10 illustrates downturned portions 42 at the sides of wiring tabs 36 which provide for attaching a respective conductor from such an electrical connector plug to the respective bus bar member.

Inner bus bar member 38 shown in FIGS. 5 and 6 is fabricated from strip stock of flexible, resilient, electrically conductive material, such as brass, with brush holders 30 being formed in position as shown, utilizing known fabrication technology, such a progressive die stamping. This creates diagonally opposite brush holders 30 which are integrally connected together through a bus bar segment 44.

Brush holders 30 are all identical in this particular embodiment. Each brush holder has a pair of parallel sidewalls 48 which are spaced to accommodate a brush 50. Each brush holder 30 also has a top wall 58 formed with a slot 52, for supporting a respective brush for radial travel, at least one locking tab 46 (see FIG. 8) to hold the brush in a fully radially retracted position prior to assembly of the brush holder assembly into a motor; and a notched end wall 56 to accommodate a wire 54 attached to the brush.

FIG. 11 is similar to FIG. 5 with the sole exception that a bus bar segment 60 extends along a larger radius than does bus bar segment 44. The reason for this is so that upon completion of the process of assembling the individual parts to create brush holder assembly 20, bus bar segments 44 and 60 will be electrically and physically spaced apart.

FIGS. 5, 6, 11, and 12 show an outwardly turned tab 62 integral with the radially inner end of each brush holder sidewall 48. Tabs 62 function to both secure the radially inner portion of a brush holder on the brush card and to provide a locating means for a spring means 64 that urges the brush radially toward the center of the brush holder assembly. The spring means is shown in FIG. 1 as a flat spring strip having coiled ends contained by sidewalls 48 and tabs 62 of the brush holder. The spring means extends from one coiled end, through space between one side of the brush and the inside of one sidewall 48, across the radially outer end of the brush, and back through space between the opposite side of the brush and the inside of the opposite sidewall 48 to the other coiled end.

The brush holder assembly is fabricated by placing inner bus bar member 38 and one face of brush card 22 and then advancing the two parts toward each other so that the brush holders 30 become inserted into respective elongated slots 28. The flexibility and resiliency of the brush holder material will form a sandwich construction in which a certain region of the brush card is between bus bar segment 44 and its two brush holders 30. FIG. 1 shows that after such association of bus bar members 38 and 40 with brush holder 22, tabs 62 are further bent at right angles to sidewalls 48, and additional tabs 63 toward the outer end of each sidewall are turned angularly to sidewalls 48 to secure the attachment of members 38, 40 to brush card 22. Wiring tabs 36 are thereby positioned proximate apertures 32, 34.

Next outer bus bar member 40 is assembled to the brush card in the same way, but with its brush holders positioned ninety degrees from those of member 38. Thus, excluding brushes 50 and spring means 64, only three separate parts are used, requiring no additional staking or riveting other than the turning of tabs 62, 63 as already described for assembly of member 38 to brush card 22.

In each brush holder assembly 20, the outer peripheral surface of the brush card is keyed to properly locate the brush holders in the motor.

The foregoing has disclosed a method for assembly of a multi-pole brush holder assembly for a four-pole, single-speed DC motor comprising the steps of: fabricating a brush card from an electrically non-conductive material to have a central aperture with four elongated slots extending equally angularly outwardly from the central aperture thereby forming a cross-like pattern; fabricating an inner bus bar member from an electrically conductive, resilient material having a pair of brush holders integrally connected by means of a bus bar segment; fabricating an outer bus bar member from an electrically conductive, resilient material having a pair of brush holders integrally connected by means of a bus bar segment; inserting the brush holders of the inner bus bar member into diametrically opposite ones of the elongated slots of the brush card with the bus bar segment disposed flat against one side of the brush card and the brush holders disposed on the other side of the brush card; inserting the brush holders of the outer bus bar member into the remaining elongated slots of the brush card with the bus bar segment disposed flat against the one side of the brush card and the brush holders disposed on the other side of the brush card, whereby each brush holder of the inner bus bar member is positioned ninety degrees from a brush holder of the outer bus bar member. The bus bar members are staked to the brush card by turning integral tabs into interference with the margins of slots in the brush card that contain the brush holders. Spring means are associated with each brush holder, and then brushes.

The completed brush holder assembly thus comprises: a brush card comprising a central aperture having elongated slots at ninety degree intervals around its circumference; an inner bus bar member disposed on the brush card to locate brush holders at one pair of diametrically opposite slots such that the brush holders of the inner bus bar member are on one side of the brush card and an integral bus bar segment connecting these diametrically opposite brush holders is on the other side of the brush card; an outer bus bar member disposed on the brush card to locate brush holders in another pair of diametrically opposite slots such that the brush holders of the outer bus bar member are on the one side of the brush holder while an integral bus bar segment of the outer bus bar member is disposed on the other side of brush card in spaced concentric relation to the bus bar segment of the inner bus bar member.

Each brush is guided by the respective brush holder for radial motion. A constant force spring is associated with each brush holder and is disposed to urge the respective brush radially inwardly toward the center of the central aperture, and hence into electrical contact with a commutator (not shown) of the electrical machine that passes through the central aperture of the brush card when the brush holder assembly is assembled into a motor.

Another embodiment of brush holder assembly 76 is shown in FIGS. 14—18. It comprises: a generally circular, non-electrically conductive card 78 having a keyed margin for being properly located in a stationary portion of an electric motor; four brush holders 80a, 80b, 80c, 80d, all identical in this embodiment, disposed on card 78 at 90 degree intervals around a central aperture 82 of card 78; two insulated electric wires 84a, 84c; four brushes 86a, 86b, 86c, 86d, all identical in this embodiment, guided by respective holders 80a, 80b, 80c, 80d for radial travel relative to the center of aperture 82; and four springs, 88a, 88b, 88c, 88d, all identical in this embodiment, for urging the respective brushes radially inwardly. The ends of wire 84a are stripped of insulation to expose stranded wire that attaches to brush holders 80a, 80b, while the ends of wire 84c are stripped of insulation to expose stranded wire that attaches to brush holders 80c, 80d.

Figure 17:
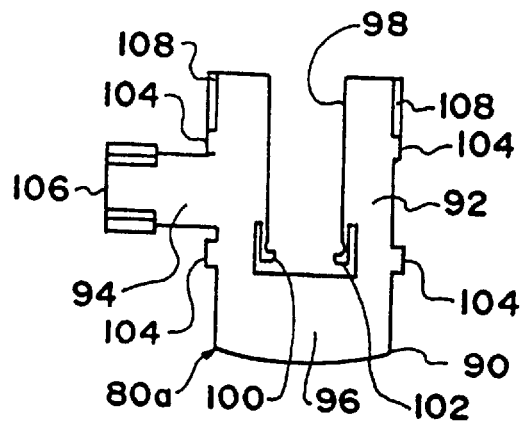
FIG. 17 is a top plan view of one of the brush holders of FIG. 14, shown by itself on an enlarged scale in a condition prior to assembly to a brush card.

Each brush holder comprises a flat main body 90 that is adapted to be disposed parallel to card 78 and that is generally U-shaped as viewed in plan in FIG. 17 to provide respective parallel sidewalls 92, 94, and an outer end wall 96 extending between the two sidewalls 92, 94. The confronting edges of sidewalls 92, 94 define a slot 98 that is open at the radially inner end but closed at the radially outer end by end wall 96. Body 90 is also provided with brush locking tabs 100, 102 proximate the radially outer end of slot 98.

Figure 15:
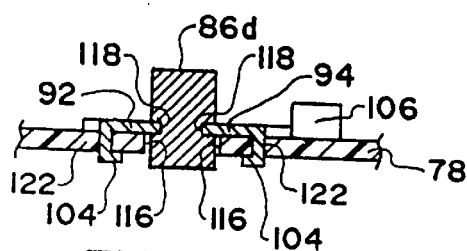
FIG. 15 is a cross section view taken along line 15—15 in FIG. 14 on a slightly enlarged scale.
Figure 18:
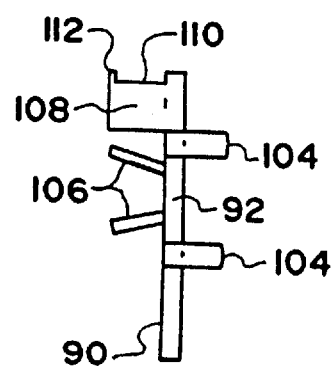
FIG. 18 is a right side view of FIG. 17.

FIGS. 17 and 18 show a condition of a brush holder where a plurality of crimping legs 104 are provided at right angles to main body 90 along the edges of sidewalls 92, 94 opposite the edge of slot 98. In this embodiment there are two crimping legs per side, spaced apart in the same direction as the length of the slot. A respective wiring tab 106 projects laterally from main body 90 between the respective crimping legs, although only one such tab appears in FIG. 17 while FIG. 14 shows two such tabs. At the radially inner end of each brush holder there are spring locators 108 that are at right angles to main body 90, but project in the opposite direction from crimping legs 104. Each spring locator is in the form of a rectangular tab having a radially inner edge that contains a notch 110 extending from main body 90 to a small tang 112 at the corner of the spring locator 108 that is spaced from main body 90. The spring locator joins with main body 90 at a location that is just radially outward of the radially inner end of the laterally outer edge of the respective sidewall 92, 94 so that the radially inner edge of the spring locator has a U-shape that is open in the radially inner direction. (For purposes of explanation, it is to be understood that only the center line 114 of each brush and its holder lies on a radial—see FIG. 14—, and reference to the side edges of the sidewalls as being radial means approximately radial.) At the location of each brush and holder on card 78, the card is provided with a rectangular slot 116 extending radially outwardly from aperture 82. The brushes are rectangular in shape and the width of each slot 116 is slightly larger than that of the brush. The slot also has a radial length that is suitable for the brush. FIG. 15 shows the sides of the brushes having slots 118 into which the inner edges of the sidewalls 92, 94 are received. Slots 118 extend radially to provide for brush travel lengthwise of slot 98, i.e. radial to the center of aperture 82. The portion of the brush shown in FIG. 15 below slots 118 has clearance to the sides of slot 116, while the opposite portion of the brush extends above the slots 118.

Card 78 comprises a pattern of four apertures 122 disposed in the margin of each slot 116 in a pattern corresponding to the pattern of crimping legs 104. The condition of each holder depicted in FIG. 18 provides for the holder to be assembled to the card by registering the projecting ends of the crimping legs with apertures 122 and bodily pushing the holder and card together to pass the crimping legs through the apertures 122 until main body 90 is disposed flat against and parallel with the card. The far ends of the legs are then turned at an angle (see FIG. 15) into interference with the margin of the apertures 122 to secure the holder in proper position on the card.

Each spring 88a, 88b, 88c, 88d is a flat strip of spring material comprising a uniform width that is just slightly less than the long dimension of notch 110. Each spring comprises coils 130, 132 at opposite ends and a connecting segment 134 extending from these coils. A spring is assembled to a holder by placing one coil 130 outside of the radially inner end of the corresponding sidewall 92 and the other coil 132 outside of the opposite sidewall 94 so that the connecting segment 134 spans the open inner end of the holder, passing through the respective notches 110. A brush is assembled by inserting its slots 118 onto the inner edges of the sidewalls 92, 94 at the radially inner end of the holder and abutting the radially outer end of the brush against the portion of segment 134 that spans the holder slot opening. The brush is then slid radially outwardly on the holder forcing the coils 130, 132 to partially uncoil and thereby increase the length of the spring segment 134 until a position like that shown in FIG. 14 is achieved. The brush locking tabs 100, 102 are used to engage the outer end of the brush to retain the brush in this retracted position, as shown in FIG. 14.

Figure 16:
FIG. 16 is a cross section view taken along line 16—16 in FIG. 14.

Referring to FIG. 14, a wiring tab 106 of holder 80c is crimped from the condition shown in FIGS. 17 and 18 onto both the free end of brush wire 138 of brush 86c and one stripped end of wire 84c to electrically connect wire 84 to brush 86c. Each holder is also provided with retaining tabs 140 at its radially outer end as shown in FIGS. 14 and 16 (but not shown in FIGS. 17 and 18). In the case of holder 80b, its retaining tabs 140 serve to retain the insulated portion of wire 84c as it extends from holder 80c to holder 80d. At holder 80d, one of its wiring tabs 106 is crimped to electrically connect the opposite stripped end of wire 84c to the free end of the brush wire 138 of brush 86d. In like manner retaining tabs 140 of holder 80d retain the insulated portion of wire 84a whose stripped ends are respectively connected to respective brush wires 138 of brushes 86a, 86b by crimping respective wiring tabs 106 of holders 80a, 80b onto the respective connections. Thus diametrically opposite brushes are electrically connected together.

Although a connector plug, such as described earlier for the first embodiment, but not specifically illustrated, is a part of assembly 76, but again not specifically shown in the second embodiment of FIG. 14, such a connector plug is electrically connected with each of the diametrically opposite brush pairs. For example, a first wire (not shown) connects one plug terminal with brush pair 86a, 86b by crimping one of the other wiring tabs 106 of either holder 80a, 80b onto a stripped end of the first wire, while a second wire (not shown) connects the other plug terminal with brush pair 86c, 86d by crimping one of the other wiring tabs 106 of either holder 80c, 80d onto a stripped end of the second wire.

The complete brush holder assembly 76 is assembled into a stationary portion of a motor such that a rotating portion of the motor, including a commutator, (i.e. the motor armature) can pass through aperture 82. The brushes are released from the locking tabs 100, 102, and the respective springs act against the radially outer ends of the respective brushes to urge them into electrical contact with the commutator.

Figure 19:
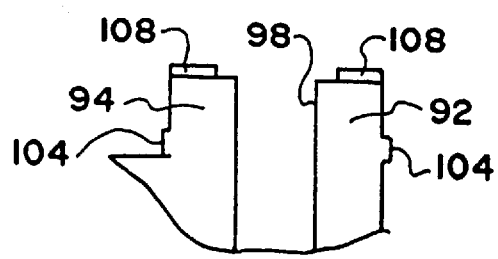
FIG. 19 is a fragmentary view of a modified form for the brush holder of FIG. 17.

FIG. 19 shows a modified form of brush holder wherein the spring locators 108 are turned at a right angle to sides 92, 94, but are at the radially inner ends of the sides. Each may have a notch like notch 110 along its laterally outer edge for retaining the spring segment 134 as it leaves the respective coils 130, 132.

Figure 20:
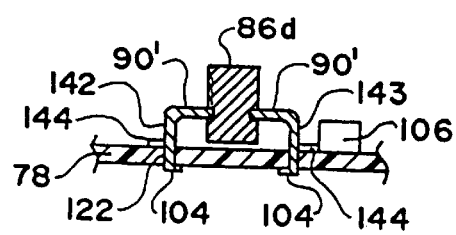
FIG. 20 is a view similar to FIG. 15 showing a modified form.

FIG. 20 shows a modified form for the holders that does not require slots 116 in brush card 78. The main body 90' comprises a flat portion, like main body 90, but with right angle flanges 142, 143 running along the laterally outer edges so that the brush is disposed entirely to one side of the brush card. Tabs 144 are turned outwardly from the lower edges of these flanges to abut the card when the holder has been inserted to the correct extent to space the brush above the card while the crimping legs 104 have been sufficiently inserted into apertures 122 to allow their projecting ends to be turned inwardly to retain the holder on the card. Notches 110 (see FIG. 18) are provided in the radially inner edge of each flange for accommodating the spring segment 134 as it leaves the respective spring coil and passes between the flat portion of main body 90' and the card, along spaces between the insides of flanges 142, 143 and respective sides of the brush; while it is preferable to provide notches 110, it may be possible to eliminate them since the spring strip will be confined between the brush card and the overlying portions of the sides 90' as it passes into association with the brush.

Figure 21:
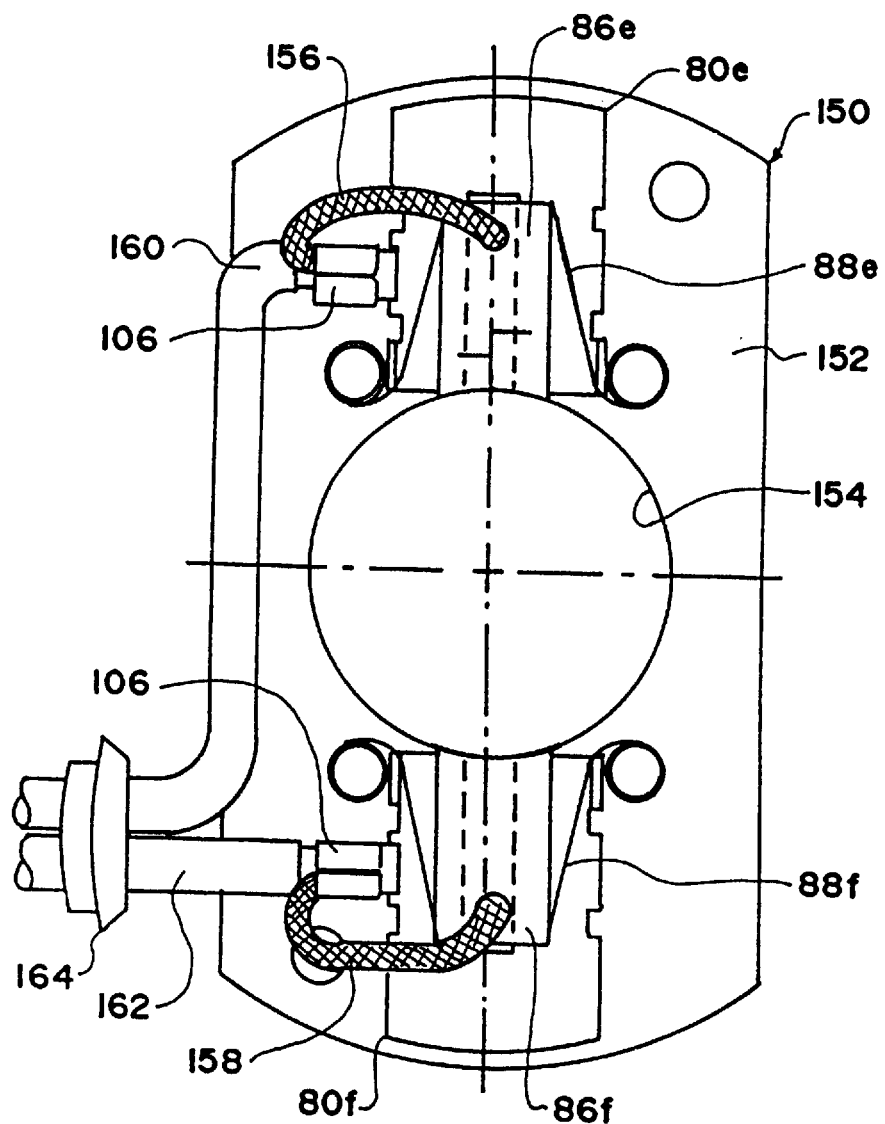
FIG. 21 is a plan view of one face of a brush holder assembly for a two-pole, single-speed motor.

FIG. 21 discloses one example of a brush holder assembly 150 for a two-pole single speed motor. It comprises a brush card 152 having a central aperture 154 having diametrically opposite slots to provide clearance for diametrically opposite brushes 86e, 86f, which are functionally associated with respective brush holders 80e, 80f and respective springs 88e, 88f in the same manner as the brushes in FIG. 14 are associated with their respective holders and springs. Brush holder 80f is like brush holder 80a of FIGS. 17 and 18; so is brush holder 80e, except that wiring tab 106 is at the opposite side. The brush holders 80e, 80f are staked to brush card 152 in the same manner as described earlier for brush holders 80a, 80b, 80c, and 80d. The wiring tab 106 of brush holder 80e crimps both short wire 156 from the respective brush and the stripped end of an insulated wire 160. The wiring tab 106 of brush holder 80f crimps both a short wire 158 from the respective brush and the stripped end of an insulated wire 162. A grommet 164 embraces the two wires 160, 162 as they lead to a connector plug (not shown).

Figure 22:
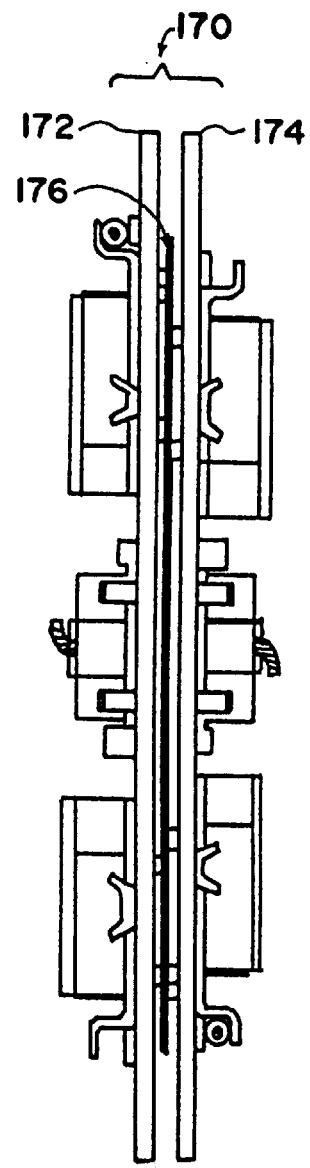
FIG. 22 is a side view of a composite brush holder assembly for a four-pole, two-speed motor comprising two individual brush holder assemblies disposed back-to-back with an intervening insulator.

FIG. 22 shows one embodiment of a four-pole, two-speed brush holder assembly 170 that comprises two generally identical brush holder assemblies 172, 174, such as those illustrated in FIG. 14 for example. The first brush holder assembly 172 is for high speed, and the second 174 is for low speed. The brush holder assemblies 172, 174 differ from the one of FIG. 14 in that the brushes are functionally associated with the brush card, the brush holders, and the springs in the manner disclosed by FIG. 20. Moreover, the low speed brush holder assembly is designed for a slightly smaller diameter commutator than is the high speed brush holder assembly. An electric insulator 176 is disposed between the two brush holder assemblies so that there is no electric circuit continuity between any of the conductors of one assembly and any of the conductors of the other assembly. Any suitable means of securing the two assemblies together with insulator 176 sandwiched between them may be employed.

Figure 23:
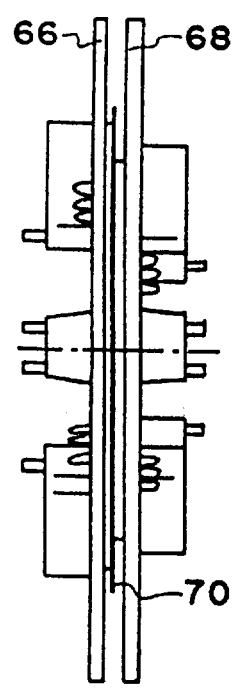
FIG. 23 is a side view of another composite brush holder assembly for a four-pole, two-speed motor comprising two individual brush holder assemblies disposed back-to-back with an intervening insulator.

To fabricate another embodiment of four-pole, two-speed brush holder assembly as illustrated in FIG. 23, it is necessary to fabricate two substantially identical brush holder assemblies such as those illustrated in FIG. 1 for example.

The first brush holder assembly 66 is for high speed and is substantially similar to the brush holder assembly 20 of FIG. 1. However instead of forming the downturned members 42 of the wiring tabs in a direction opposite the brush holders as illustrated in FIG. 2, the members are formed in the direction of the brush holders 30. The central aperture is sized to allow the high speed commutator of the motor to extend therethrough. Additional apertures are formed in the brush card of the brush holder assembly 66 to allow the wiring tabs to extend above the top surface of the brush card.

The second brush holder assembly 68 is formed on a second brush card with the central aperture of a different, smaller size from that of the first brush card of assembly 66. This is to accommodate the second commutator of the motor. The first and second brush holder assemblies 66, 68 are positioned with their relatively flat faces facing each other and with an insulator 70 positioned between them. The insulator prevents any electrical shorting between the two brush holder assemblies.

Brush holder assemblies 20, 66, and 68 show the outer peripheral surface of the brush card formed with keys to fixedly locate the brush holder assembly in proper position in a motor at assembly.

The brush holders are formed of suitable strip stock material and fabricated by conventional fabrication technology comprising stamping and trimming methods so that each holder is of one-piece construction.

While a presently preferred embodiment of the invention has been illustrated and described, it should be appreciated that principles of the invention apply to all embodiments falling within the scope of the following claims.

What is claimed is:

1. An electrical machine comprising a stationary portion and a rotating portion, the latter portion comprising an armature having a commutator, a brush holder assembly disposed on said stationary portion and comprising a non-electrically conductive card having a central aperture through which a portion of said armature passes, a plurality of brush holders disposed on said card and spaced circumferentially around said aperture, electrically conductive brushes guided by said brush holders for motion radially of said aperture, spring means for urging each of said brushes radially inward toward said aperture and into forceful electrical contact with said armature, each said brush holder comprising sides that are disposed along respective sides of the respective brushes and that extend in the direction of brush travel, each said brush holder comprising a respective spring locator that extends integrally laterally outward from a radially inner end of each respective side of the brush holder and terminates as a free end edge that is transverse to said card, said spring locators providing for containment of said spring means for the respective brush, said spring means comprising a spring strip that has respective spring coils at opposite lengthwise ends thereof and a spring segment extending between said spring coils, said spring coils being respectively disposed laterally outward of the respective sides of each holder and behind the respective spring locators, and the respective spring segment extending from a respective spring coil of the respective spring strip around the end edge of the respective spring locator prior to entry of the spring segment into operative association with the respective brush, said spring strip passing along a respective side of the respective brush, thence laterally across a surface of the respective brush, thence along the other side of the respective brush, thence around the end edge of the other spring locator of the respective brush holder, and thence to the other spring coil disposed behind said other spring locator of the respective brush holder.

2. An electrical machine as set forth in claim 1 in which said sides of each holder are disposed flat against one side of said card, said sides of each brush comprise respective slots extending in the direction of travel of the respective brush, said sides of said holder comprise respective edges that fit respectively into said slots for guiding the motion of the respective brush, said card comprises apertures through which portions of said brushes pass, and each said spring segment engages said surface of the respective brush at a location on the respective brush that is to one side of said card.

3. An electrical machine as set forth in claim 2 in which said spring locators comprise tabs that extend integrally from the radially inner ends of said sides of said brush holders and are disposed substantially at 90 degrees to that portion of said brush holders that is disposed flat against said one side of said card.

4. An electrical machine as set forth in claim 3 in which said end edges of said spring locators are disposed in said tabs and comprise respective notches through which said spring strip segment passes.

5. An electrical machine as set forth in claim 4 in which said notches face radially inwardly.

6. An electrical machine as set forth in claim 4 in which said notches face laterally.

7. An electrical machine as set forth in claim 6 in which said notches face laterally outwardly of the respective holder side.

8. An electrical machine as set forth in claim 1 in which there are four of said holders arranged at 90 degree intervals about said central aperture, and including electrical conductor means for electrically connecting diametrically opposite pairs of said brushes.

9. An electrical machine as set forth in claim 8 in which said electrical conductor means comprises respective insulated wires for respectively connecting diametrically opposite pairs of said brushes, and one holder of each pair comprises retention means for retaining the insulated wire that electrically connects the other pair of said brushes.

10. An electrical machine as set forth in claim 1 in which each side of said holders comprises a first wall that is perpendicular to said card and a second wall that extends laterally toward the opposite side in spaced relation to said card, each said second wall comprises an edge that fits into a respective slot in a respective side of the respective brush for guiding the travel of the respective brush.

11. An electrical machine as set forth in claim 1 in which said spring locators comprise tabs that extend integrally from the radially inner ends of said sides of said brush holders.

12. An electrical machine as set forth in claim II in which said end edges of said spring locators are disposed in said tabs and comprise respective notches through which said spring strip segment passes.

13. An electrical machine as set forth in claim 12 in which said notches face radially inwardly.

14. An electrical machine as set forth in claim 12 in which said notches face laterally.

15. A brush holder assembly comprising a non-electrically conductive card having a central aperture, a plurality of brush holders disposed on said card and spaced circumferentially around said aperture, electrically conductive brushes guided by said brush holders for motion radially of said aperture, spring means for urging each of said brushes radially inward toward said aperture, each said brush holder comprising sides that are disposed along respective sides of the respective brushes and that extend in the direction of brush travel, each said holder comprising a respective spring locator that extends integrally laterally outward from a radially inner end of each respective side of the brush holder and terminates as a free end edge that is transverse to said card, said spring locators providing for containment of said spring means for the respective brush, said spring means comprising a spring strip that has respective spring coils at opposite lengthwise ends thereof and a spring segment extending between said spring coils, said spring coils being respectively disposed laterally outward of the respective sides of each holder and behind the respective spring locators, and the respective spring segment extending from a respective spring coil of the respective spring strip around the end edge of the respective spring locator prior to entry of the spring segment into operative association with the respective brush, said spring strip passing along a respective side of the respective brush, thence laterally across a surface of the respective brush, thence along the other side of the respective brush, thence around the end edge of the other spring locator of the respective brush holder, and thence to the other spring coil disposed behind said other spring locator of the respective brush holder.

16. A brush holder assembly as set forth in claim 15 in which said sides of each holder are disposed flat against one side of said card, said sides of each brush comprise respective slots extending in the direction of travel of the respective brush, said sides of said holder comprise respective edges that fit respectively into said slots for guiding the motion of the respective brush, said card comprises apertures through which portions of said brushes pass, and each said spring segment engages said surface of the respective brush at a location on the respective brush that is to said one side of said card.

17. A brush holder assembly as set forth in claim 16 in which said spring locators comprise tabs that extend integrally from the radially inner ends of said sides of said brush holders and are disposed substantially at 90 degrees to that portion of said brush holders that is disposed flat against said one side of said card.

18. A brush holder assembly as set forth in claim 17 in which said end edges of said spring locators are disposed in said tabs and comprise respective notches through which said spring strip segment passes.

19. A brush holder assembly as set forth in claim 18 in which said notches face radially inwardly.

20. A brush holder assembly as set forth in claim 18 in which said notches face laterally.

21. A brush holder assembly as set forth in claim 20 in which said notches face laterally outwardly of the respective holder side.

22. A brush holder assembly as set forth in claim 15 in which there are four of said holders arranged at 90 degree intervals about said central aperture, and including electrical conductor means for electrically connecting diametrically opposite pairs of said brushes.

23. A brush holder assembly as set forth in claim 22 in which said electrical conductor means comprises respective insulated wires for respectively connecting diametrically opposite pairs of said brushes, and one holder of each pair 5 comprises retention means for retaining the insulated wire that electrically connects the other pair of said brushes.

24. A brush holder assembly as set forth in claim 15 in which each side of said holders comprises a first wall that is perpendicular to said card and a second wall that extends laterally toward the opposite side in spaced relation to said card, each said second wall comprises an edge that fits into a respective slot in a respective side of the respective brush for guiding the travel of the respective brush.

25. A brush holder assembly as set forth in claim 15 in which said spring locators comprise respective tabs integral with the radially inner ends of said sides of said brush holders .

26. A brush holder assembly as set forth in claim 15 in which said end edges of said spring locators are disposed in said tabs and comprise respective notches through which said spring strip segment passes.

27. A brush holder assembly as set forth in claim 26 in which said notches face radially inwardly.

28. A brush holder assembly as set forth in claim 26 in which said notches face laterally.

29. A brush card assembly comprising a brush card, at least one brush holder mounted on said card, a brush for each such brush holder, each such brush holder comprising wall means for guiding positioning of the respective brush along a direction on the respective brush holder, a spring strip associated with each respective brush and brush holder, each such spring strip comprising a lengthwise intermediate segment and lengthwise opposite end segments, at least one of which end segments comprises a coil that coils and uncoils to provide decreasing and increasing length to said lengthwise intermediate segment, and said wall means further comprises locator means for locating the end segments of the respective spring strip relative to the respective brush holder such that the intermediate segment of the respective spring strip extends from one of the respective end segments along a side of the respective brush, thence laterally across the respective brush, and thence along another side of the respective brush to the other end segment of the strip so that the intermediate segment exerts a force on the respective brush in one sense along the direction of guidance of the respective brush by the wall means of the respective brush holder, wherein said locator means comprises an integral extension of said wall means that extends integrally laterally outward from an end of said wall means and terminates as a free end edge that is transverse to said card, said at least one coil of said spring means for the respective brush is disposed behind said integral extension, and the respective spring segment extends from said at least one coil of said spring means for the respective brush around the end edge of the integral extension prior to entry of the spring segment into operative association with the respective brush.

30. A brush card assembly as set forth in claim 29 in which said wall means of each such brush holder comprises laterally spaced apart sidewalls, said integral extension comprises a tab that is integral with a radially inner end of a respective sidewall and that extends substantially at 90 degrees from that sidewall to said end edge, and the at least one coil of the respective spring strip is located behind said tab with the intermediate segment of the respective spring strip extending from said at least one coil around said end edge.

31. A brush card assembly as set forth in claim 30 in which said end edge comprises a notch through which the intermediate segment of the respective spring strip passes.

32. A brush card assembly as set forth in claim 31 in which said end edge faces in the same direction as the respective spring strip urges the respective brush.

33. A brush card assembly as set forth in claim 31 in which said end edge faces laterally of the direction along which the respective spring strip urges the respective brush.

34. A brush card assembly as set forth in claim 33 in which said end edge faces laterally outwardly of the direction along which the respective spring strip urges the respective brush.

35. An electrical machine as set forth in claim 8 in which said electrical conductor means comprises a first bus bar for electrically connecting the brushes of one of said pairs of brushes and a second bus bar for electrically connecting the brushes of the other of said pair of brushes, said first bus bar and the brush holders for said one pair of brushes are contained in a first one-piece part, and said second bus bar and the brush holders for said other pair of brushes are contained in a second one-piece part.

36. An electrical machine as set forth in claim 35 in which said card comprises axial end faces, respective aperture portions extend through said card between said axial end faces thereof, each brush holder is disposed at a respective aperture portion on one axial end face of the card, the first bus bar and the second bus bar extend across the other axial end face of the card between their respective brush holders.

37. An electrical machine as set forth in claim 36 in which the first bus bar and the second bus bar are disposed against the other axial end face of the card.

38. A brush holder assembly as set forth in claim 22 in which said electrical conductor means comprises a first bus bar for electrically connecting the brushes of one of said pairs of brushes and a second bus bar for electrically connecting the brushes of the other of said pair of brushes, said first bus bar and the brush holders for said one pair of brushes are contained in a first one-piece part, and said second bus bar and the brush holders for said other pair of brushes are contained in a second one-piece part.

39. A brush holder assembly as set forth in claim 38 in which said card comprises axial end faces, respective aperture portions extend through said card between said axial end faces thereof, each brush holder is disposed at a respective aperture portion on one axial end face of the card, the first bus bar and the second bus bar extend across the other axial end face of the card between their respective brush holders.

40. A brush holder assembly as set forth in claim 39 in which the first bus bar and the second bus bar are disposed against the other axial end face of the card.

41. A brush holder assembly comprising a non-electrically conductive card having an axis, a plurality of brush holders spaced circumferentially around said axis, electrically conductive brushes guided by said brush holders for motion radially of said axis, spring means for urging each of said brushes radially of said axis, electrical conductor means for electrically connecting a plurality of said brushes, wherein said electrical conductor means comprises a bus bar, and wherein said plurality of brush holders and said bus bar are a one-piece part mounted on said card.

42. A brush holder assembly as set forth in claim 41 wherein said one-piece part is a stamped metal.

43. A brush holder assembly as set forth in claim 42 wherein said bus bar has an arcuate extent that is concentric with said axis, and said bus bar has a rectangular transverse cross section.

44. A brush holder assembly as set forth in claim 41 wherein said one-piece part further comprises a wiring tab providing for connection of an electrical conductor wire.

45. A brush holder assembly as set forth in claim 41 comprising a plurality of further brush holders spaced circumferentially around said axis, electrically conductive brushes guided by said further brush holders for motion radially of said axis, spring means for urging each of said brushes radially of said axis, further electrical conductor means for electrically connecting the brushes guided by said further brush holders, wherein said further electrical conductor means comprises a bus bar, and wherein said plurality of further brush holders and said further bus bar are a further one-piece part mounted on said card.

46. A brush holder assembly as set forth in claim 45 wherein each of said one-piece parts is a stamped metal.

47. A brush holder assembly as set forth in claim 46 wherein each bus bar has an arcuate extent that is concentric with said axis, and one bus bar is spaced radially of the other on the card.

48. A brush holder assembly as set forth in claim 41 wherein each one-piece part further comprises a respective wiring tab providing for connection of a respective electrical conductor wire.

49. A one-piece electrically conductive part for mounting on a brush card for an electrical machine, said part comprising a metal stamping having a plurality of brush holders for holding electrically conductive brushes and a bus bar that relatively locates said plural brush holders.

50. A part as set forth in claim 49 wherein said bus bar has an arcuate extent that is concentric with an axis, and said bus bar has a rectangular transverse cross section.

51. A part as set forth in claim 50 wherein said one-piece part further comprises a wiring tab providing for connection of an electrical conductor wire.

52. A brush holder assembly comprising a non-electrically conductive card having an axis, a plurality of brush holders spaced circumferentially around said axis, electrically conductive brushes each guided by a respective one of said brush holders along a direction of motion having a component which is radial to said axis, spring means for urging each of said brushes along the respective direction of motion, electrical conductor means for electrically connecting a plurality of said brushes, wherein said electrical conductor means comprises a bus bar, and wherein said plurality of brush holders and said bus bar are a one-piece part mounted on said card.

53. A part as set forth in claim 49 in which the bus bar has an extent between said brushes that includes a component which is circumferential to an axis, and each brush holder comprises a brush space that is disposed axially of the circumferential component of extent of the bus bar.

54. A part as set forth in claim 53 in which all brush holders are disposed axially in the same sense from the circumferential component of extent of the bus bar.

55. A brush holder assembly as set forth in claim 41 wherein said brush holders guide said brushes for radial motion along an imaginary line passing through said axis.

* * * * *